March 9, 1937. W. LEATHERS 2,073,347
COLLAPSIBLE WHEEL FOR VACUUM CLEANERS
Filed Oct. 21, 1936
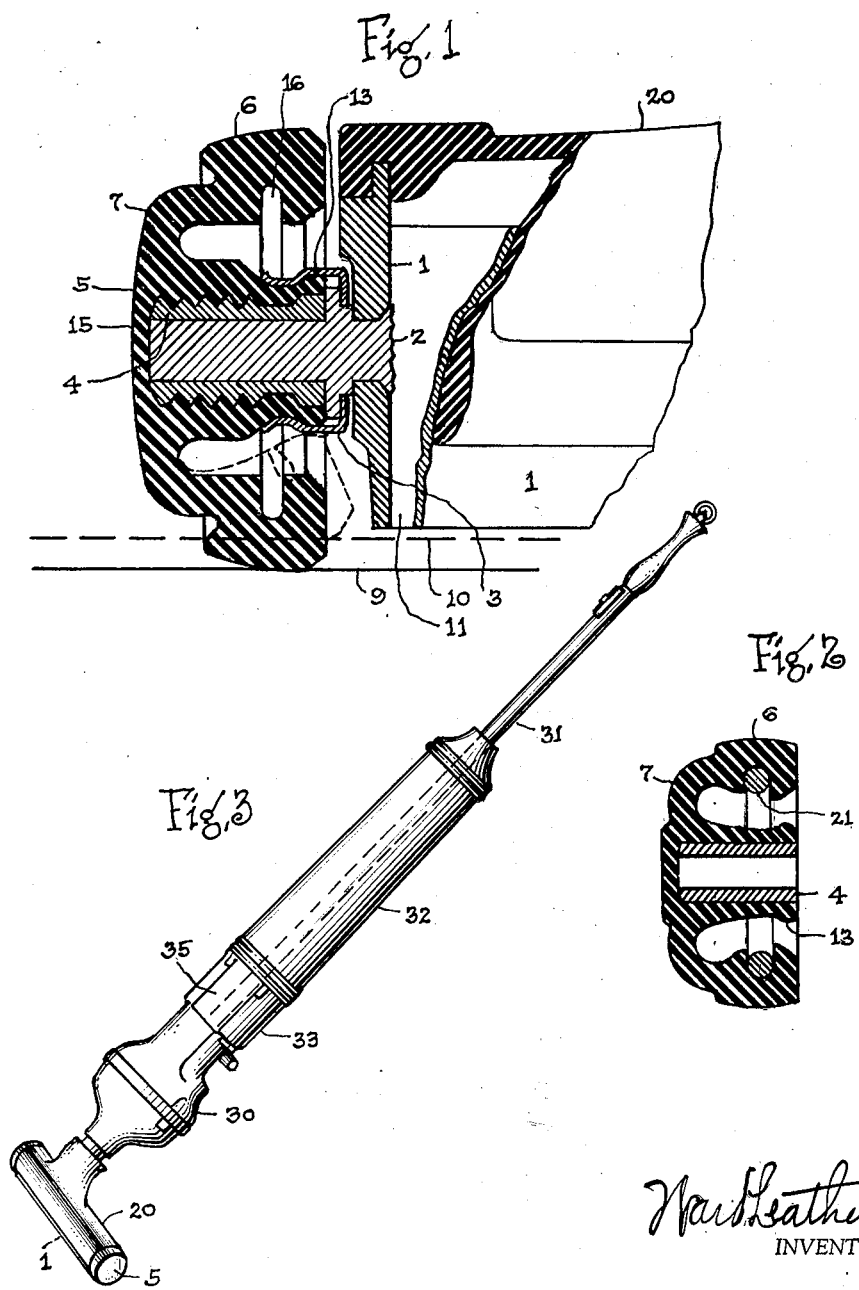

Patented Mar. 9, 1937

2,073,347

UNITED STATES PATENT OFFICE 2,073,347

COLLAPSIBLE WHEEL FOR VACUUM CLEANERS

Ward Leathers, Haworth, N. J., assignor to Quadrex Corporation, New York, N. Y., a corporation of Delaware Application October 21, 1936, Serial No. 106,762

4 Claims. (Cl. 15—16)

The object of my invention is to produce a new means of raising and lowering the nozzle of a vacuum cleaner from the carpet.

My invention applies primarily to that type of vacuum cleaner wherein the motor-suction-unit and the operator's handle are rigidly and integrally joined. With such type of cleaner the nozzle requires wheels for free movement over the floor and a retractability of said wheels for the purpose of changing the relationship between wheels and nozzle to conform with the cleaning requirements of high and low pile floor coverings. Heretofore such wheel retractability has been obtained, when operator's pressure is applied to the handle of the cleaner, by one of two types of structure: one of these consists of a free-end spindle joined to a shank, supporting a floor wheel, and with the shank so hinged that the wheel may move upward with respect to the nozzle when pressure is applied to the handle. The other method has been to hold a spindle on both sides of a floor wheel and design the bow or housing to slide in a groove or socket provided in the end of the nozzle.

My invention provides an entirely new method of obtaining a depressible nozzle. It consists of a collapsible wheel which, although firm enough to sufficiently support the weight of the machine for free gliding movement over long pile fabric, a slight pressure on the handle collapses the wheel to such extent as is desired for reaching that point where the nozzle does proper cleaning on the lowest pile fabrics or on a bare floor.

I have accomplished this result by the use of a wheel mounted on a free-end spindle firmly affixed to the end of the nozzle, said wheel being made of rubber, such as automobile tire tread stock, but with the rubber so distributed as to permit the wheel to collapse as freely as desired and to as great a distance as required for vacuum cleaner purposes with very small pressure applied to the handle.

In order to set forth my invention in terms that all those familiar with these arts may understand, I have prepared this specification to which is appended a drawing, of which:—

Figure 1 is an enlarged vertical cross section of collapsible wheel and mounting.

Figure 2 is a vertical cross section of a modified wheel.

Figure 3 is a perspective view of a rigid handle type vacuum cleaner, to which my invention is particularly applicable.

A die cast nozzle frame 1 is provided with a fixed steel spindle 2. A spring cup or clip 3, preferably made of spring steel or bronze and with slotted sides, is held by a flange on the spindle 2. The spindle passes through the cup before being riveted, or otherwise joined, on its inner end to the nozzle casting 1. This spring cup is for the purpose of holding the wheel from coming off when the hub of the same has been pressed into it. A bronze hub 4 is vulcanized into a rubber wheel 5 at the time of moulding. The wheel is preferably moulded of soft rubber tread stock. The disposition of the rubber, however, is of the utmost importance. The wheel is so designed as to produce substantially a hollow, annular cup-like form. The upper rim of the cup 6 is used as the tread. The bottom of the cup 7 is of such section as to provide the resistance to collapse that is required. The distance between the tread portion 6 and the hub is sufficient for a collapsing movement sufficient for the service for which it is used. In Figure 1 the wheel is shown resting on a floor line 9. A floor line 10, shown in dotted lines, indicates the position of the floor when the wheel is collapsed and the nozzle is at its point closest to the floor. The collapsed portion of the wheel is also shown in dotted lines. A ridge of rubber, metal or other suitable material 13 is moulded in the wheel, or otherwise provided, for purposes of engagement with the inside of the spring fingers of the spring cup 3. It is obvious that this wheel can be pulled off or put on manually, and firmly held by friction. By means of this construction the outside of the wheel 15 may be entirely covered with rubber in order to avoid the marking of furniture or baseboards. The rubber section disposed near the outer face of the wheel and nearest the outer end of the spindle is sufficiently to one side of the tread 6 as to produce a free collapse of the floor contacting portion when desired, under the manual pressure desired, and of exactly the distance required or desired. A groove 16 on the inside of the tread portion 6 aids in providing a more vertical collapse to the wheel. It may also be used when so designed as a means of slightly collapsing the inner portion of the tread section in order to maintain the greatest roundness to the wheel when it is subjected to only the normal weight of the machine.

The nozzle casting 1 is shown covered with a rubber booth or cover 20.

A modification of my collapsible wheel is shown in Figure 2, wherein a rigid ring 21, preferably of metal, is inserted within the tread portion 6.

In Figure 3 I have illustrated the use of my collapsible wheel on a type of vacuum cleaner to which it is particularly well adapted wherein a motor-suction-unit 30 is joined to the nozzle 1 and provided with a substantially co-axial and rigidly joined handle 31. The handle is surrounded by a filter 32 which is in communication at its bottom end with a dirt-receptacle 33, the latter being disposed around the handle 31 alongside of the up-draught dirt-laden air duct 35, between the motor-suction-unit and the filter, the whole having an elongated and substantially annular form.

This specification sets forth the principles of my collapsible wheel and describes and illustrates two of the many possible physical forms that it may be given. It is obvious, however, that as the requirements of the wheel are altered, the shape and action may also be altered throughout a wide range for the purpose of meeting requirements such as size of wheel, range of collapsibility, limit of collapsibility under normal weight of machine, pressure range of collapsibility, verticality of collapsibility, and pressures required for a range of movement on the nozzle of the vacuum cleaner. There are also many other uses for this wheel where these and other factors enter into its use, but however these principles may be used for serving a useful purpose the form and action of the rubber may be widely altered to meet such requirements without departing from the principles and spirit of my invention.

I claim:

1. In a vacuum cleaner, a motor-suction-unit, a handle rigidly joined thereto, a transverse nozzle also joined thereto at a point remote from the handle, said nozzle having on its end a fixed spindle supporting a floor-engaging wheel, said wheel being made of soft rubber, substantially cup-shaped and wherein the rim of the cup comprises the tread.

2. In a vacuum cleaner wheel, a hub firmly joined to the center of a soft rubber cup-like form wherein the rim is the tread and clearance between rim and hub permit free collapse of the rim portion engaging the floor when downward pressure is exerted by the operator.

3. In a vacuum cleaner wheel, a hub firmly joined to the center of a flexible cup-like form wherein the rim is the tread and the cup-like form permits free collapse of the rim portion engaging the floor when downward pressure is exerted by the operator.

4. In a vacuum cleaner wheel, a hub firmly joined to a soft rubber web, said web firmly joined to or integral with a yieldable rim or tread, and with the inner wall of said web and said rim forming a chamber so disposed in a vertical plane between hub and rim as to permit free collapse of the rim portion engaging the floor when downward pressure is exerted by the operator.

WARD LEATHERS.